US006873880B2

(12) United States Patent
Hooke et al.

(10) Patent No.: US 6,873,880 B2
(45) Date of Patent: Mar. 29, 2005

(54) MACHINE FOR PERFORMING MACHINING OPERATIONS ON A WORKPIECE AND METHOD OF CONTROLLING SAME

(75) Inventors: David Hooke, Palmdale, CA (US); Matt Swain, La Crescenta, CA (US)

(73) Assignee: Lockheed Martin Corporation, Rockledge, MD (US)

( * ) Notice: Subject to any disclaimer, the term of this patent is extended or adjusted under 35 U.S.C. 154(b) by 295 days.

(21) Appl. No.: 10/025,578

(22) Filed: Dec. 26, 2001

(65) Prior Publication Data

US 2003/0120377 A1 Jun. 26, 2003

(51) Int. Cl.[7] .............................................. G06F 19/00
(52) U.S. Cl. ..................................... 700/159; 700/178
(58) Field of Search ............................... 700/159, 178, 700/160; 901/1, 9, 14, 46, 47; 242/390.9; 250/559.29, 559.36; 356/130, 614, 623, 631

(56) References Cited

U.S. PATENT DOCUMENTS

| 4,698,775 A | * | 10/1987 | Koch et al. ................. 700/218 |
| 5,044,844 A | | 9/1991 | Backhouse |
| 5,240,359 A | | 8/1993 | Backhouse |
| 5,302,833 A | | 4/1994 | Hamar et al. |
| 5,413,454 A | * | 5/1995 | Movsesian .................. 414/729 |
| 5,647,554 A | * | 7/1997 | Ikegami et al. .......... 242/390.9 |
| 5,666,202 A | * | 9/1997 | Kyrazis ....................... 356/614 |
| 5,768,137 A | | 6/1998 | Polidoro et al. |
| 6,615,099 B1 | * | 9/2003 | Muller et al. ................ 700/166 |

* cited by examiner

Primary Examiner—Leo Picard
Assistant Examiner—Carlos R. Ortiz

(57) ABSTRACT

A machine for performing machining operations on a workpiece is disclosed that includes a carriage with a robotic arm mounted thereon. The arm includes a movable head containing a tool for performing the machining operations on the work-piece. A laser position determination system is included for determining the actual spatial relationship position the carriage and the work-piece and providing a first signal representative thereof and further determining the spatial relationship of the head to the work-piece during actual machining operations on the work-piece and providing a second signal representative thereof. A computer having a computer program provides a third signal to the robotic arm for machining the work-piece based on a predetermined spatial relationship between the carriage and the work-piece and for receiving the first and second signals and adjusting the third signal based on the actual spatial relationship between the carriage and the work-piece and the head and the work-piece.

18 Claims, 6 Drawing Sheets

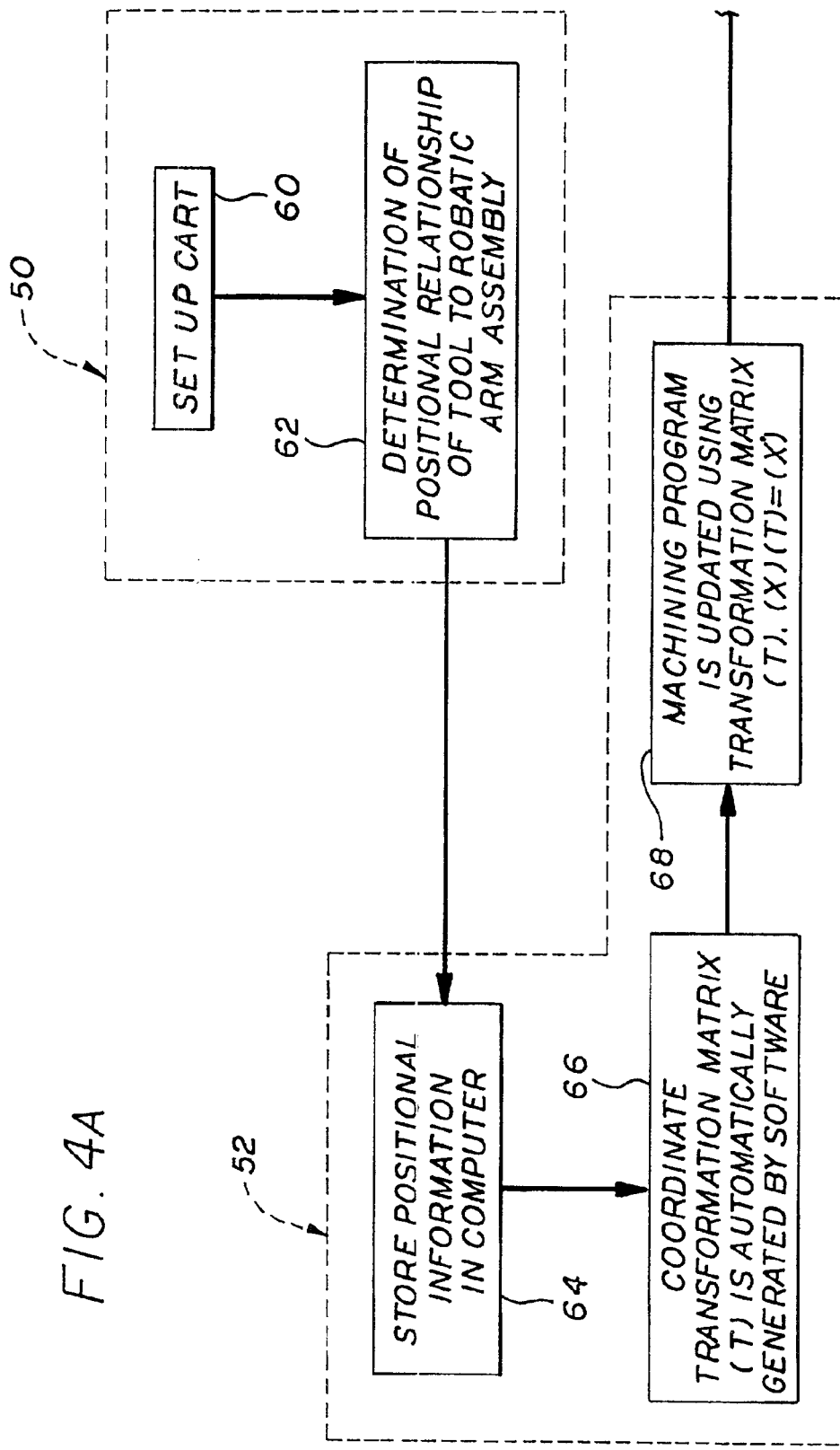

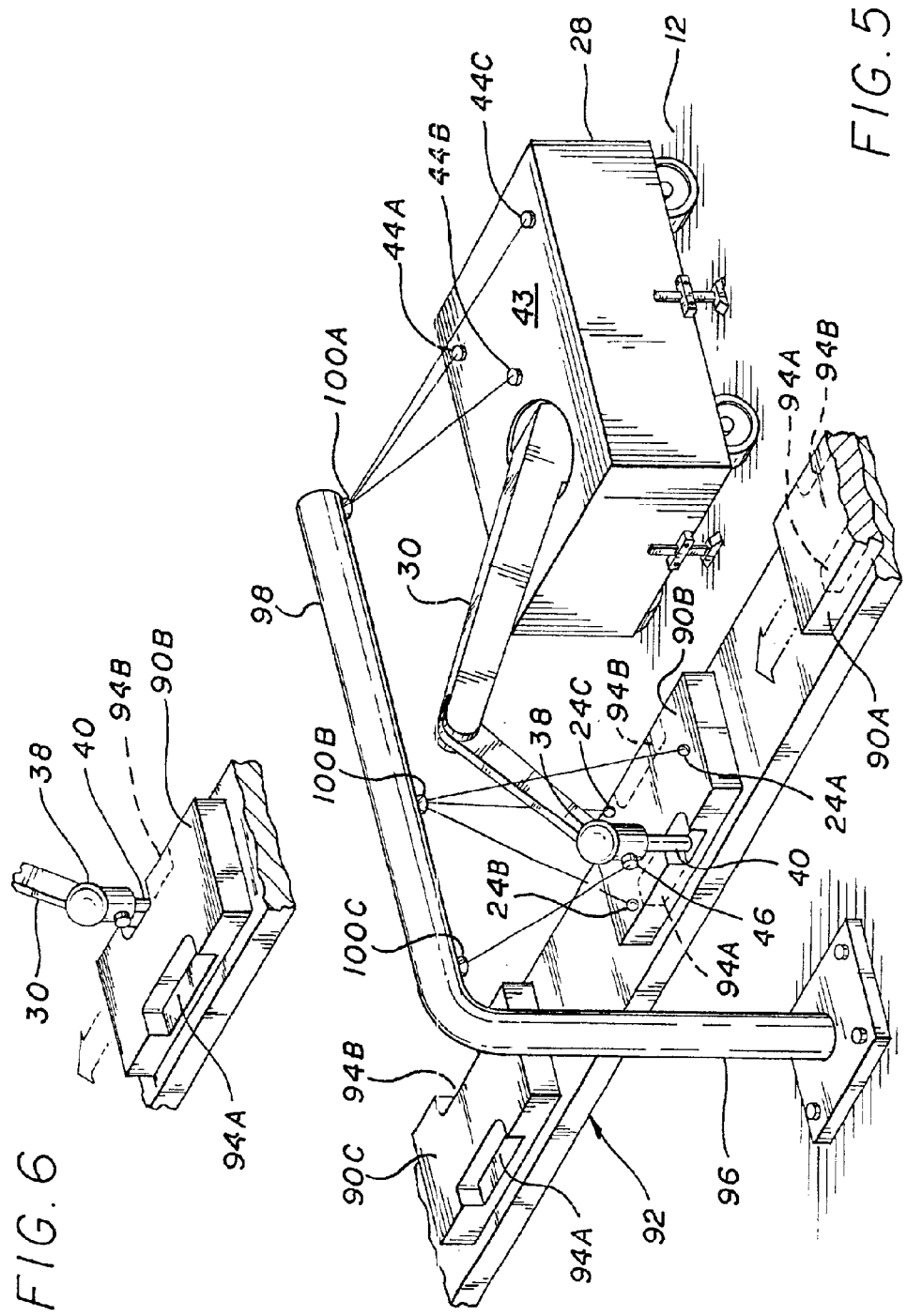

MACHINE FOR PERFORMING MACHINING OPERATIONS ON A WORKPIECE AND METHOD OF CONTROLLING SAME

BACKGROUND OF THE INVENTION

1. Field of the Invention

The invention relates to the field of computer controlled and laser guided portable machines for machining parts or work-pieces and, in particular, to a machine that uses a laser position determination system to correct errors in the position of the machining head due to uncontrolled movements of the machine or work-piece.

2. Description of Related Art

Computer controlled milling machines and the like are old in art. They generally consist of a very rigid rails to which is mounted a movable carriage containing a head for mounting a cutter or other tool. The work-piece to be machined is mounted on a very rigid platform and the head is moved thereover. Such machines are so rigid that the head and tool can be precisely positioned under the control of a computer.

Some machines, by the nature of their design, can not position the head and tool to a precise position and thus require supplemental alignment systems. For example, U.S. Pat. No. 5,302,833 "Rotational Orientation Sensor For Laser Alignment Control System" by M. R. Mamar, et al.

U.S. Pat. No. 5,044,844 "Machining Apparatus" by A. E. Backhouse discloses a machine wherein the machining head is mounted on a carriage located on the end of a boom. The boom pivots in a horizontal plane about an axis on spaced circular rails. A laser alignment system senses any inaccuracies in the level of the rails and adjusts the machining head accordingly. However, this system assumes that the cutting head is always properly positioned. This is because the boom and carriage are robust assemblies and only subject to rail inaccuracies. A somewhat similar system is disclosed in U.S. Pat. No. 5,240,359 "Machining Apparatus" also by A. E. Backhouse.

U.S. Pat. No. 5,768,137 "Laser Aligned Robotic Machining System For Use In Rebuilding Heavy Machinery" by R. J. Polidoro, et al. discloses a positioning system for resurfacing and repairing rails and guideways of large heavy machinery. A monorail assembly incorporating the milling head is assembled parallel to the rail. The straightness of the rail is determined by a laser measurement system. This information is fed to a computer and is used to align the monorail with the rail. The rail can then be machined to bring it back into tolerance. However, this machine requires a complex set up procedure and is only adapted to machine rails. It could not be used to machine molds and the like.

None of the above machines are capable of being brought to a remote site and used to machine a work-piece that has been previously setup in a fixed position. All of the prior art machines require precise alignment of the work-piece to the machine. In addition, none of the prior art machines automatically monitor the position of the cutting head and insure that it is in the proper position during machining operations; thus compensating for any movement of the machine or work-piece.

Thus, it is a primary object of the invention to provide a portable machine for performing machining operations.

It is another primary object of the invention to provide a portable machine for performing machining operations on a work-piece that does not require precise positioning of the machine prior to commencement of machining operations.

It is a further object of the invention to provide a portable machine for performing machining operations on a work-piece that automatically compensates for any movement, inadvertent or otherwise, of the machine or work-piece being machined.

SUMMARY OF THE INVENTION

The invention is a machine for performing machining operations on a work-piece. In detail, the invention includes a carriage having a movable robotic arm assembly incorporating a head containing a tool for performing the machining operations on the work-piece. A laser position determination system is included for determining the actual spatial relationship of the carriage and the work-piece and provides a first signal representative thereof. The laser position determination system further determines the spatial relationship of the head to the work-piece during actual machining operations on the work-piece and provides a second signal representative thereof. A computer running computational software provides a third signal to the robotic arm for machining the work-piece based on a predetermined spatial relationship between the carriage and the work-piece. The computer is adapted to receive the first and second signals and the software adjusts the third signal based on the actual spatial relationship between the carriage and the work-piece prior to machining operations and between the head and the work-piece during machining operations.

In a first embodiment, it is assumed that the work-piece remains in a fixed position, thus it is only the carriage that can move due to vibrations or the like and the robotic arm subject to error in positioning. Thus it is only necessary to initially determine the spatial relationship between the carriage and work-piece and thereafter only monitor the spatial position of the head during machining operations. Therefore, the laser position determination system includes a single laser transceiver assembly and at least one laser target on the carriage, work-piece and head of the robotic arm assembly. The laser transceiver is first used to determine the spatial relationship of the work-piece, then the carriage and then is placed in a tracking mode to track the head during machining operations.

In the second embodiment, it is assumed that the work-piece may move. For example, the work-piece could be on a conveyor system that passes by the machine. The work-piece could also be stationary, but subject to movements due to vibrations and the like. Preferably, there are three laser transceivers, one to determine the spatial relationship of the work-piece prior and during machining operations, one to determine the spatial relationship of the carriage prior to machining operations and a third to determine the spatial relationship of the head of the robotic arm assembly during machining operations. In this, embodiment, the computer program continuously monitors the spatial relationship of the work-piece during machining operations and adjusts the third signal accordingly.

The method of increasing the accuracy of a machine for performing machining operations on a work-piece, the machine having a movable head containing a tool for performing the machining operations on the work-piece, the head movable to predetermined positions directed by a computer program within a computer, includes the step of:

1. Determining the actual spatial relationship between the carriage and work-piece prior to machining operations and providing a first signal representative thereof;

2. Continuously determining the actual spatial relationship between the head and work-piece during the performance of machining operations and providing a second signal indicative of the actual position; and 3. Adjusting predetermined spatial relationship of the head during machining operations based on the first and second signals.

The method of using the second embodiment involves the steps of:

1. Continuously determining the actual spatial relationship between the carriage and work-piece and providing a first signal representative thereof;
2. Continuously determining the actual spatial relationship between the head and work-piece during the performance of machining operations and providing a second signal indicative of the actual position;
3. Continuously determining the actual spatial relationship of the work piece during machining operations and providing a third signal indicative thereof; and
4. Adjusting the spatial relationship of the head based on the difference between the first, second and third signals.

The first embodiment of the machine can be used to perform machining operations on a stationary work-piece while compensating for inadvertent movement of the carriage or positional errors caused by the robotic arm. In the second embodiment inadvertent movement of the carriage, robotic arm errors, as well as unintentional movement of the work-piece can be compensated for. In fact, this latter embodiment could be used with parts on a movable assembly line, because the work-piece position is continuously monitored.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 4A is a first part of a flow chart of process for controlling the machine.

FIG. 5 is a top view of a second embodiment of the machine illustrating the machining of a work-piece in a first position along a moving conveyor.

FIG. 6 is a view similar to FIG. 5 illustrating the machine with the conveyor having moved the work-piece to a second position.

DESCRIPTION OF THE PREFERRED EMBODIMENT

Figure 1:
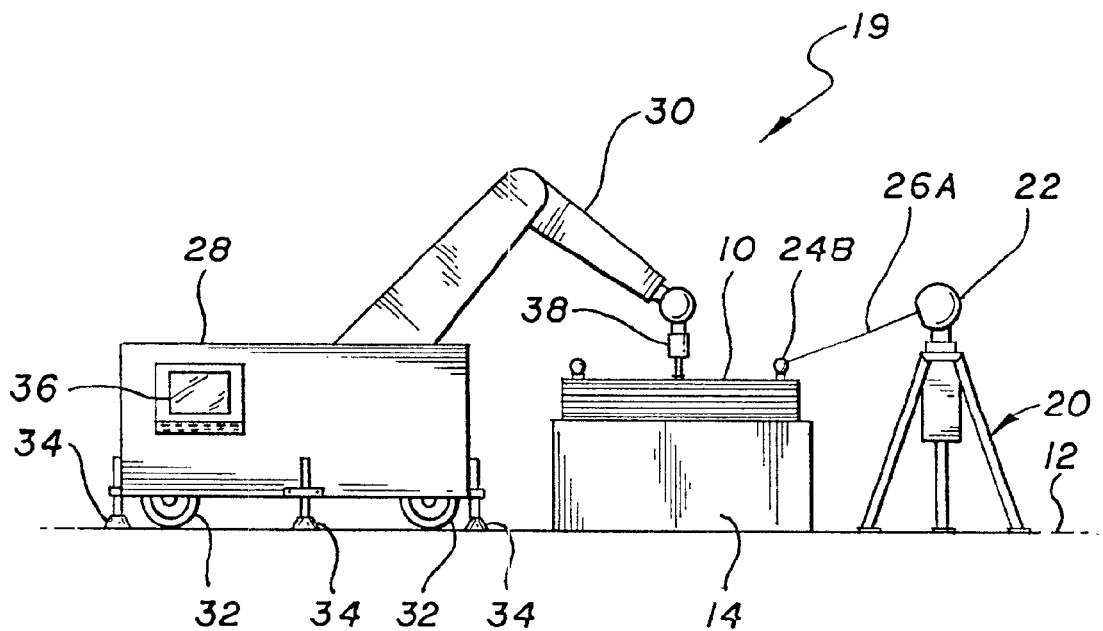
FIG. 1 is a side view of the machine and work-piece to be machined.
Figure 3:
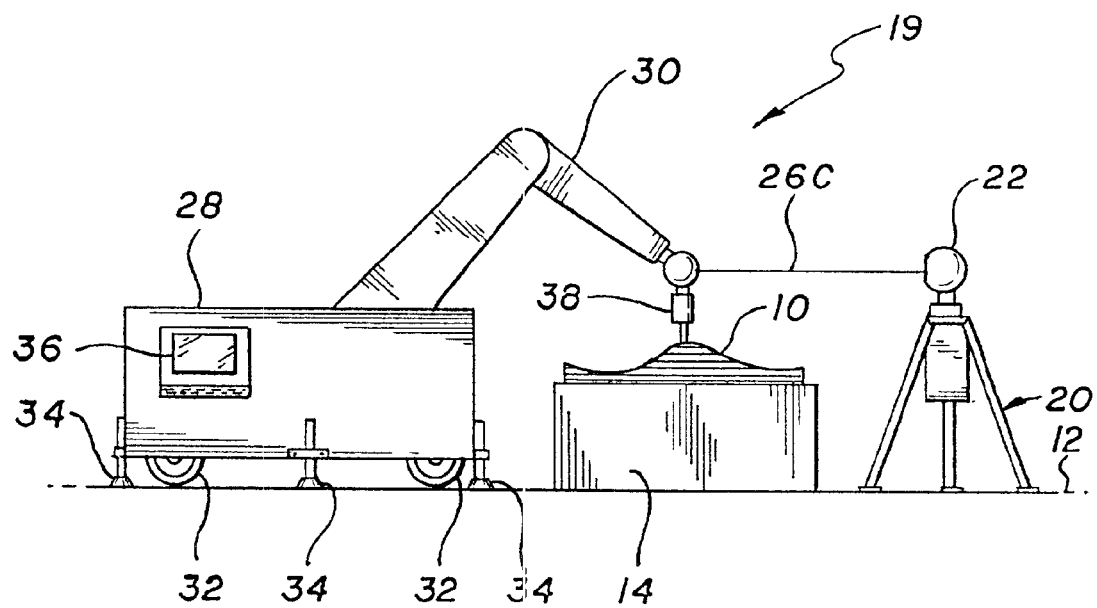
FIG. 3 is a view similar to FIG. 1 illustrating the machine actually performing machining operations on the work-piece.
Figure 2:
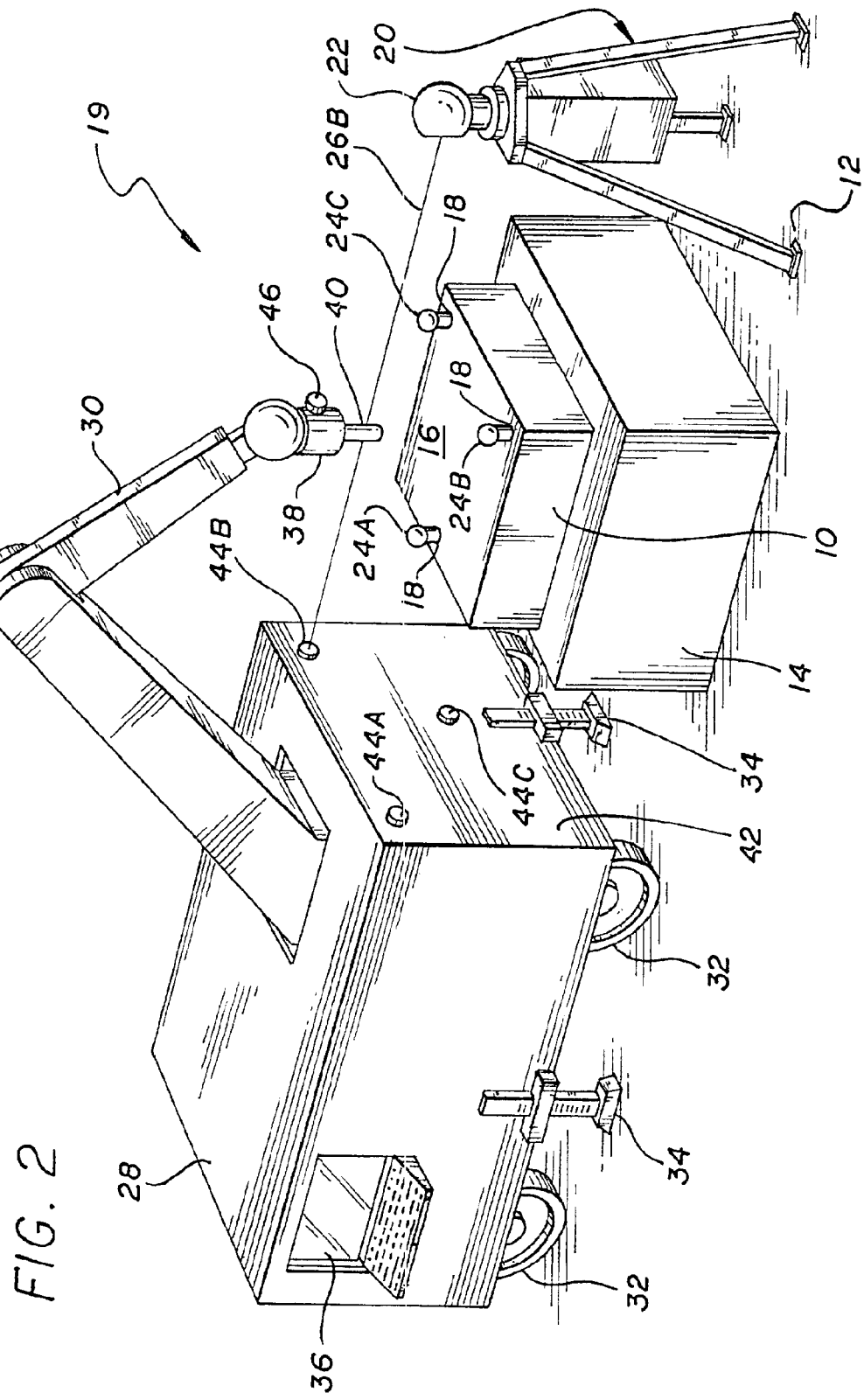
FIG. 2 is a perspective view of the machine and work-piece to be machined.

Referring to FIGS. 1–4, a work-piece or part to be machined, indicated by numeral 10, is shown secured to the floor 12 by a mounting fitting 14. As illustrated, the work-piece 10 is rigid foam; however, the work-piece could be a ceramic or metal. The top surface 16 includes three tooling holes 18 in a spaced relationship thereon. The subject machine, generally designated by numeral 19, includes a laser alignment system 20, which comprises a laser transceiver assembly 22 mounted in proximity to the work-piece 10, and three laser targets 24A, 24B and 24C mounted in the tooling holes 18. A typical laser alignment system is fully discussed in U.S. Pat. No. 4,714,339 "Three to Five axis Laser Tracking Systems" by K. C. Lau, et al., herein incorporated by reference; although other laser alignment systems can be used.

In detail, the laser transceiver assembly 22 transmits a laser beam, indicated by numeral 26 to the laser targets 24A–C mounted on the work-piece 10 and is directed back to the laser transceiver assembly 22. An interferometer interferes the source beam with the beam that has traveled twice between the laser transceiver assembly 22 and targets 24A–C in order to measure the separation. By measuring the directions of the beams 26 relative to the targets 24A–C, the targets 24A–C can be located in spatial coordinates and additionally the orientation of the targets 24A–C can be determined. The measurements are fed to a laser-tracking computer (not shown), which is able to calculate the spatial coordinates of the work piece 10. Systems based on this technology are commercially available. It must be noted that while three laser targets are shown, in some applications a single target may be adequate.

The machine 19 further includes a portable carriage 28 having a robotic arm assembly 30 mounted on top. The carriage 28 includes wheels 32, stabilizing jacks 34 and a computer 36. As illustrated the robotic arm has a tool head 38 in which is mounted a tool 40, such as a cutter. Robotic arms are commercially available from companies such as Fanuc Robotics, Rochester Hills, Mich. The front face 42 of the carriage 28 includes three laser targets 44A, 44B arid 44C in a spaced relationship; although in some applications, a single target can be used. While the targets 44A–C are shown positioned on the front face 42 other positions are possible such as on the top surface 43. The carriage 28 is wheeled up to the work-piece 10 and locked in place by the jacks 34. Preferably, the carriage 28 is positioned in a predetermined optimum position in relationship to the work-piece 10. This optimum position would be the position of carriage as originally set in the machining program in the computer 36. However, even if the carriage 28 is set with precise hand measurements, they will not generally be precise enough, such that compensation for positional error must be taken into account.

Thus the alignment system 20 is used to determine the spatial relationship of carriage 28 to the work-piece 10 using the targets 24A–C and 44A–C. Again, it should be noted that in some cases a single target 44A might suffice. The spatial coordinates of the work-piece 10 and carriage 28 are provided to the computer 36. Since the relationship between the carriage 28 and robotic arm assembly 30 will be known by the computer 36, the relationship of the robotic arm to the work-piece can be computed. Thus the computer 36 can calculate the actual offsets to the spatial relationship required to compensate for the actual position of the carriage 28 to the work-piece 10.

As previously stated, the carriage 28, even if locked in place by the jacks 34, may move and the robotic arm assembly 30 may introduce inaccuracies, and the work-piece 10 is not necessarily on a rigid platform, as in the case of a typical milling machine or the like. Therefore, it is possible that such movement, even if extremely small, could cause inaccuracies in the machining operations. Thus a laser target 46 is mounted on the head 38 of the robotic arm assembly 30. The laser transceiver assembly 22 uses the target 46 to locate the actual spatial relationship of the head 38 during actual machining operations. This information is provided to the computer 36, which continuously adjusts the position of the head 38 so that it is in the required spatial relationship to the work-piece 10.

Figure 4B:
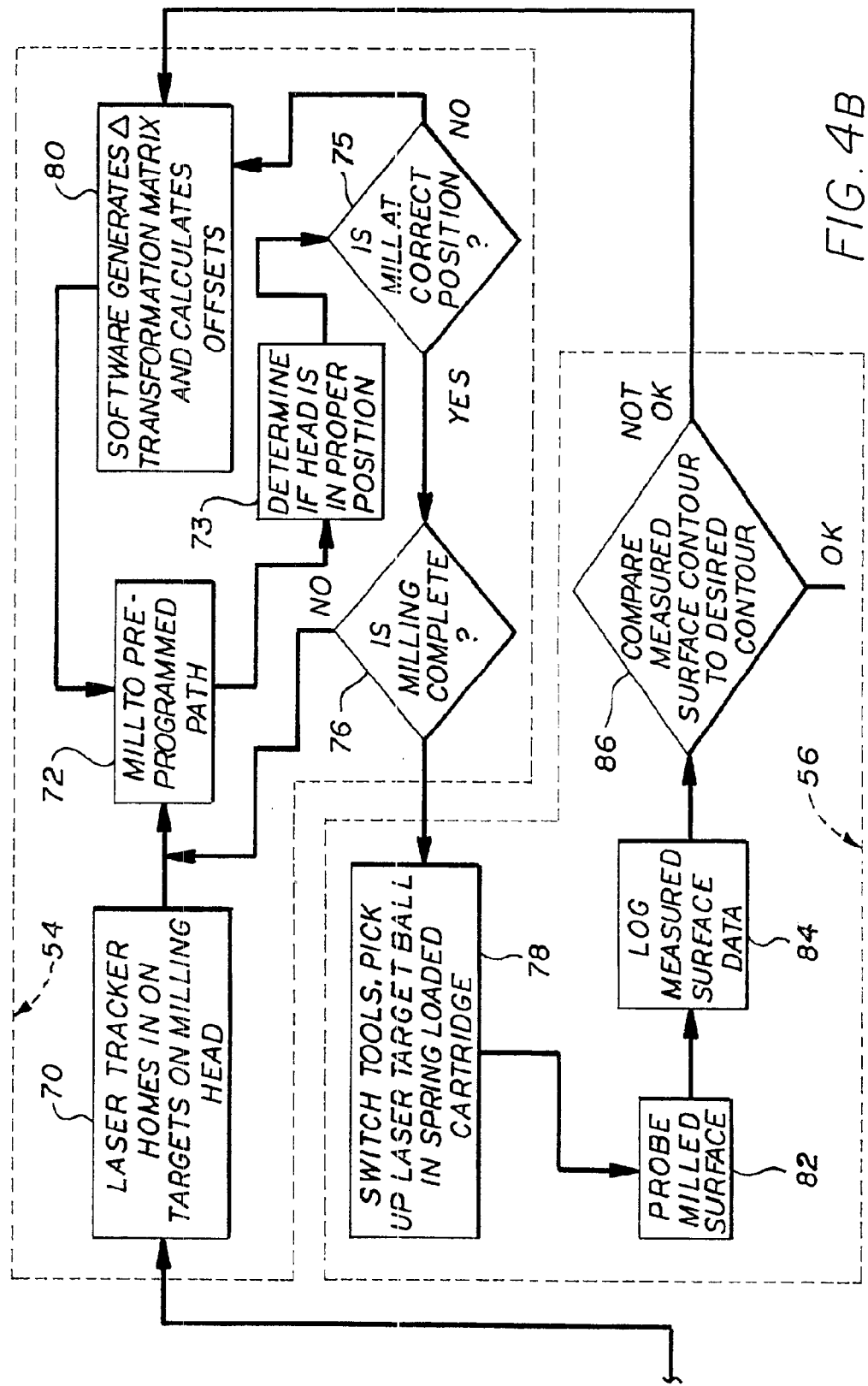
FIG. 4B is a second part of the flow chart illustrated in FIG. 4A.

FIGS. 4A and 4B show a flow chart of the machining process. The flow chart is divided into four sections:

1. Set up 50, wherein the work-piece and carriage positions are determined. The carriage 28 is wheeled into position in proximity to the work-piece 10. Once in position, the jacks 34 are engaged so that all the weight of the carriage 28 is on the jacks. Note, while desirable, the carriage 28 need not be level or in a particular orientation. The laser alignment system 20 is used to determine the position of the work-piece 10 and carriage 28. The data on the coordinates of both the work-piece 10 and carriage 28 are used to update the computer program within the computer 36 for machining the work-piece 10.

2. Pre-Processing 52, wherein the computer processes the positional information and up-dates the machining program. The position information is stored in the computer 36 and is used to calculate a coordinate transformation matrix that will be applied to adjust the robotic arm assembly 30 to machine the work-piece 10. This allows the tool head 38 to be moved to any position necessary to perform the machining operations on the work-piece 10.

3. In-Situ Processing 54, wherein the work-piece 10 is machined with the laser transceiver assembly 22 providing head 38 position information to correct for errors. Prior to machining operations, transceiver assembly 22 will focus on the target 46 on the head 38 of the robotic arm assembly 30 and go into a live feedback tracking mode. The robotic arm assembly 30 will follow the preprogrammed computer program that has been modified by the incorporation of actual positions of the carriage 28 and work-piece 10. However, the transceiver assembly 22 receives real-time head 38 spatial relationship information. If there is a deviation, the computer program calculates a difference or offset matrix and uses it to "real time" re-position the head 38 to the required position. This process is updated several times a second insuring a smooth machining operation.

4. Post Processing 56, wherein the work-piece is inspected. After the machining operation, the robotic arm assembly 30 is used to inspect the work-piece 10. It will replace the tool 40 with an inspection target (not shown). The transceiver assembly 22 tracks the inspection targets' position as the now the machined work-piece is probed. In detail, the flow chart is as follows.

Section 1, Set up 50 involves steps of:

Step 60—Set up carriage 28 and alignment system 20 in proximity to the work-piece 10.

Step 62—Determination of positional relationship of work-piece 10 to the robotic arm assembly 30 of the carriage 28 and provides the information to the computer 36.

Section 2, Pre-Processing 52 involves the steps:

Step 64—Store positional information in computer 36.

Step 66—Generate coordinate transformation matrix.

Step 68—Update machining program using transformation matrix.

Section 3, In-Situ Processing 54 involves the steps of:

Step 70—Transceiver assembly 22 tracks target 46.

Step 72—Machine to preprogrammed path.

Step 73—Measure actual position of head

Step 75—Determine if head 38 is at proper position. Computer program determines deviation between actual head position and desired position. If the head 38 is at the proper position, to Step 76.

Step 76—Determine if machining is complete. If complete then to Step 78 of Post Processing 56 Section. If machining is not complete then go to Step 72.

Step 80—Generate a delta transformation matrix and calculate offsets. Thereafter return to Step 72

Section 4, Post Processing 56

Step 78—Robotic arm assembly 30 replaces tool 40 and inserts a spring loaded laser target (not shown)

Step 82—Machine work-piece inspected.

Step 84—Record measured data

Step 86—compare measured data with desired surface contour. If not within tolerance, return to step 80, if within tolerance then job is complete.

A second embodiment of the invention is depicted in FIGS. 5 and 6. Here work-pieces 90A, 90B and 90C are shown mounted on a conveyor system 92 and have two slots 94A and 94B shown on completed part 90C, partially machined on work-piece 90B and in dotted lines on part 90A. The carriage 28' is identical to carriage 28 except that the laser targets 44A, 44B and 44C are mounted on the top surface 43. The tool 40 mounted in the head 38 of the robotic arm 30 is shown machining the slot 94A in the work-piece 90B. In FIG. 6, the work-piece 90B, which has moved further down the conveyor system 92 and the machine has machined the slot 94A and has started to machine slot 94B. A support column 96 extends up from the floor 12, which includes a horizontal arm 98 extending over the conveyor system 92 and carriage 28'. The arm 98 mounts three laser transceiver assemblies 100A, for tracking laser targets 44A–44C; 100B for tracking laser targets 24A, 24B and 24C mounted on the work-piece 90B; and 100C for tracking laser target 46 mounted on the head 38. The spatial relationships of the work-piece 90B and head 38 can be tracked as the conveyor system 92 moves the work-pieces there along. Note that is not necessary to track the carriage 28' during the machining operations because the head 38 is monitored. Therefore, the laser transceiver 100C could be used to initially locate the carriage 28' and thereafter used to monitor head 38 position; thus only two laser transceiver assemblies are really necessary.

Figure 7:
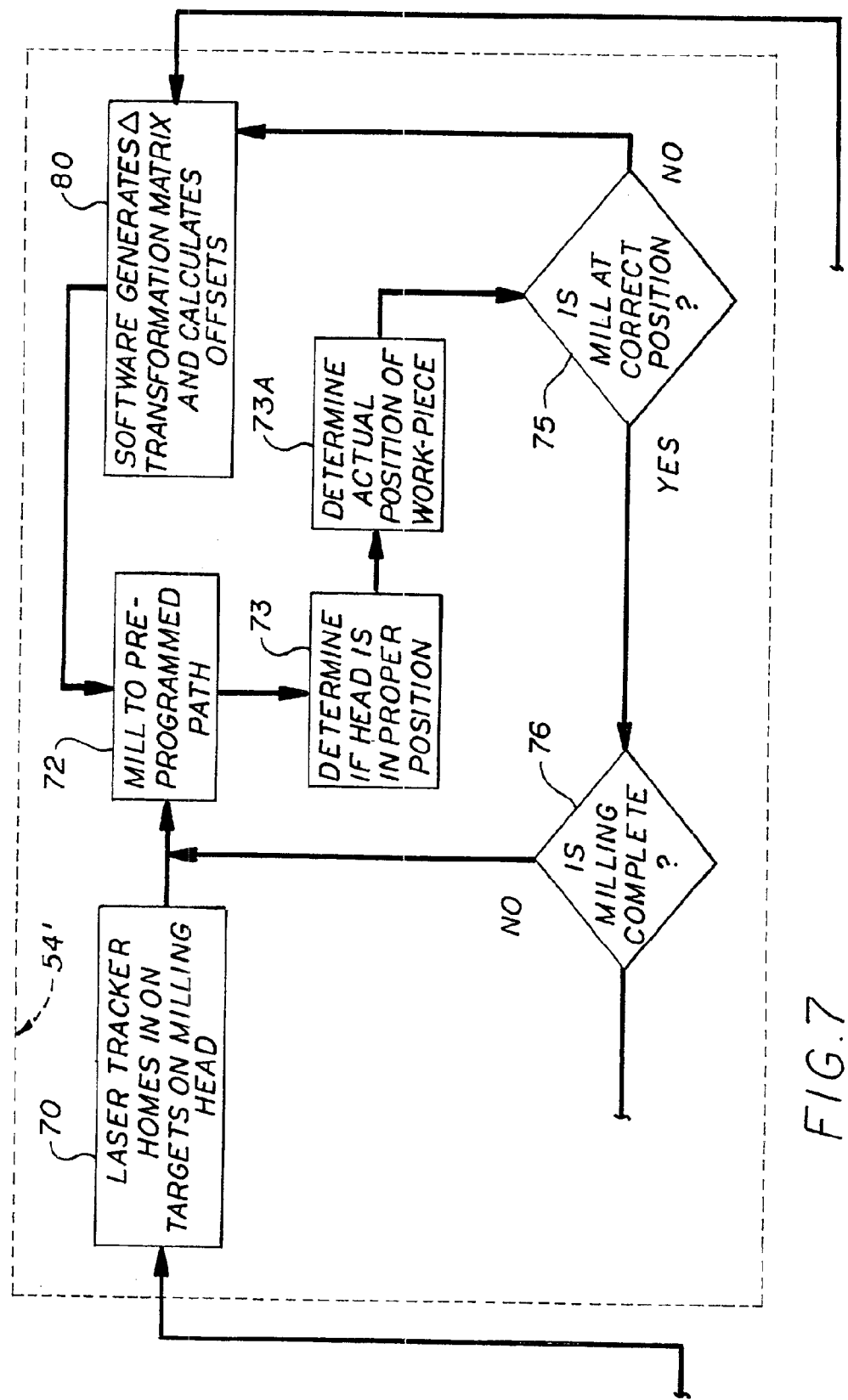
FIG. 7 is a portion of FIG. 4B illustrating a revised In-Situ Processing Step.

Referring to FIG. 7, the process is similar to that disclosed in FIG. 4B except the In-Situ Processing Section, now indicated by numeral 54', includes a "Step 73A Determination of actual position of work-piece" between "Step 73—Determine if head is in proper position" and "Step 75—Is head at correct position". In Step 73A, the laser transceiver assembly 100B tracks the targets 24A, B and C to determine if the work-pieces 90A–C have moved from their initial position.

Thus the invention can be used to perform machining operations on a work-piece. In the first embodiment, it can accommodate inadvertent movement between the work-piece and carriage. In the second embodiment, the machine can accommodate continuous movement between the carriage and work-piece. Furthermore, while a conveyor system was shown for purposes of illustration, a basically stationary work-piece, subject to small movements, could easily be accommodated. Additionally, it should also be noted that while the machining operations discussed were milling, hole drilling or other operations can be performed with the machine.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the machine tool industry.

What is claimed is:

1. A machine for performing machining operations on a work-piece comprising:
   a carriage;
   a movable head containing a tool for performing the machining operations on the work-piece;
   a laser position determination system operable to determine the spatial relationship of the work-piece during the machining operations, determine the spatial relationship of the carriage and the work-piece and provide a first signal representative thereof, and to further determine the spatial relationship of the head to the work-piece during actual machining operations on the work-piece and to provide a second signal representative thereof;
   a computer processor operable to provide a third signal to the movable head for machining the work-piece based on a predetermined spatial relationship between the carriage and the work-piece and to receive the first and second signals and to adjust the third signal based on the actual spatial relationship between the carriage and the work-piece prior to machining operations.

2. The machine as set forth in claim 1 wherein the carriage is portable.

3. The machine as set forth in claim 1 wherein the laser position determination system includes:
   a laser transceiver system;
   at least one first laser target mounted on the carriage;
   at least one second laser target mounted on the work-piece; and
   at least one third laser target mounted on the head.

4. The machine as set forth in claim 3 wherein the carriage includes means to lock the machine in a position in proximity to the work-piece.

5. The machine as set forth in claim 3 wherein the laser position determination system includes a laser transceiver assembly adapted to track the at least one first, second and third laser target.

6. The machine as set forth in claim 1 wherein the laser position determination system comprises:
   a first laser transceiver assembly for tracking the at least one target mounted on the carriage;
   a second laser transceiver assembly for tracking the at least one laser target mounted on the work-piece; and
   a third laser transceiver assembly for tracking the at least one laser target mounted on the head.

7. The machine as set forth in claim 1 wherein the laser position determination system comprises:
   a first laser transceiver assembly for tracking an at least one target mounted on the carriage; and
   a second laser transceiver assembly for tracking an at least one laser target mounted on the work-piece.

8. A computer controlled machining system comprising:
   a carriage with a movable head for performing machining operations on a work-piece, and
   a computer program for providing signals to the head to move the head to specific spatial relationships with the work-piece;
   a laser position determination system operable to:
      determine a spatial relationship between the carriage and the work-piece, and provide a first signal representative thereof;
      continuously determine a spatial relationship of the head to the work-piece during actual machining operations and provide a second signal indicative there of; and
      compare the second signal to the first signal and to adjust the first signal so that the head is positioned based on the actual spatial relationship between the carriage and the work-piece prior to machining operations and between the head and the work-piece during machining operations.

9. The machine as set forth in claim 8 wherein the carriage is portable.

10. The machine as set forth in claim 9 wherein the laser position determination system includes:
    a laser transceiver system;
    at least one laser target mounted on the machine;
    at least one laser target mounted on the work-piece; and
    at least one laser target is mounted on the head.

11. The machine as set forth in claim 10 wherein the carriage includes means to lock the machine in a position in proximity to the work-piece.

12. The machine as set forth in claim 8, or 9, or 10, or 11, wherein:
    the laser position determination system also determines the spatial relationship of the work-piece during machining operations and provides a third signal representative thereof; and
    computer executable logic instructions are operable to compare the third signal to the first signal and to adjust the first signal.

13. A method of increasing the accuracy of a machine that includes a carriage with a robotic arm, the robotic arm having a head including a tool that performs machining operations on a work-piece, the head movable to a computed spatial relationship to the work-piece directed by a first signal from a computer based on a predetermined spatial relationship between the carriage and work-piece, the method comprising:
    determining the actual spatial relationship between the carriage and the work-piece prior to machining operations and providing a second signal representative thereof;
    continuously determining a spatial relationship between the head and work-piece during the performance of machining operations and providing a third signal indicative of the actual spatial relationship there between; and
    adjusting the first signal based on the difference between the first signal and the second and third signals such that the head remains in the computed spatial relationships to the work-piece.

14. The method as set forth in claim 13, including determining the spatial relationship between the carriage and the work-piece during machining operations and providing a fourth signal representative thereof; and adjusting the first signal based on the difference between the first and fourth signals such that the head remains in the computed spatial relationships to the work-piece with this adjustment continuously accomplished during machining operations.

15. The method as set forth in claim 14 wherein determining the spatial relationship between the carriage and the work-piece and providing a fourth signal representative thereof and continuously determining the spatial relationship between the head and the work-piece during the performance of machining operations and providing a third signal indicative of the spatial relationship between the head and the work-piece, and additionally adjusting the first signal based on the difference between the first and fourth signals such that the head remains in the computed spatial relationships to the work-piece with this adjustment continuously accomplished during machining operations is accomplished by means of a laser position determination system.

16. A machine for performing machining operations on a work-piece comprising:
   a portable carriage;
   a robotic arm mounted on the carriage, the robotic arm having a head for machining the work-piece;
   a laser position determination system comprising:
      at least one first laser target mounted on the work-piece:
      at least one second laser target mounted on the carriage;
      at least one third laser target mounted on the head; and
      a laser transceiver for determining the spatial relationship of the carriage, work-piece, and the head during machining operations, respectively, and to provide output signals representative thereof; and
      a computer having a first part of a computer program for machining the work-piece with a tool based on a preset spatial relationship between the carriage and the work-piece, a second part of the computer program adapted to adjust the first part of the computer program in response to the output signals such that the head is properly positioned during the machining operations should the work-piece or the robotic arm introduce positional errors.

17. A machine comprising:

a portable carriage;

a robotic arm mounted on the carriage, the robotic arm having a head for machining a work-piece;

a laser position determination system comprising:
   at least one first laser target mounted on the work-piece;
   at least one second laser target mounted on the carriage;
   at least one third laser target mounted on the head; and
   first, second and third laser transceiver assemblies for directing laser beams at the at least one first, second and third one targets respectively and to provide first, second and third signals representative of spatial relationships of the carriage, work-piece, and the head during machining operations, respectively; and a computer having a first part of a computer program for machining the work-piece with a tool based on a preset spatial relationship between the carriage and the work-piece, a second part of the computer program adapted to adjust the first part of the computer program in response to the first, second and third signals such that the head is properly positioned during the machining operations should the work-piece or the robotic arm introduce positional errors.

18. The machine as set forth in claim 1, further comprising a robotic arm mounted on the carriage upon which the movable head is mounted.

* * * * *